Feb. 9, 1960  J. A. JACKSON ET AL  2,924,041
BALLOON
Filed June 10, 1957

*INVENTOR.*
JAMES A. JACKSON
WALTER L. JACKSON
BY
Knox & Knox

United States Patent Office 2,924,041
Patented Feb. 9, 1960

2,924,041

BALLOON

James A. Jackson and Walter L. Jackson, El Cajon, Calif.

Application June 10, 1957, Serial No. 664,699

5 Claims. (Cl. 46—90)

This invention relates generally to balloons and more particularly to an improved, valved mouthpiece and balloon assembly.

The principal object of this invention is to provide a valved mouthpiece which will operate with complete satisfaction under the conditions of relatively low pressure differentials experienced in toy balloons, it being remembered that the pressure in the balloon is very frequently only that attained by inflating the balloon by mouth, and the valve must remain closed for a considerable period when only this pressure differential is available.

Another object of this invention is to produce a valved mouthpiece wherein inertial forces and skin-friction and related forces are utilized in assuring a more perfect valve seal when the valve plunger snaps from open to closed position.

Still another very important object of this invention is to provide a valved mouthpiece wherein the valve seat is defined by bore portions tapering in opposite directions toward said valve seat, so that a linear engagement of the valve plunger and the valve body is obtained at said valve seat, and this feature is combined with and enhanced as to its efficacy in producing a low pressure sealing engagement by the provision of the valve body in a material which is somewhat deformable, so that even the low pressure available is sufficient, when combined with the inertial forces above mentioned, to assure establishment of sealing relation. In this regard, it will of course be understood that the valve plunger is tapered and is also constructed of deformable material to heighten this effect.

A last object to be specifically mentioned is to provide a balloon mouthpiece assembly wherein the mouthpiece has two axially spaced external seats to receive the terminus of the inflating stem or neck of the balloon, and, when used with a larger balloon, the smaller of said two external seats is functional as a guard for the plunger, constituting means to prevent an intermediate portion of the inflating stem or neck of the balloon from fouling the valve plunger.

With these objects definitely in view, along with other objects which will appear hereinafter as this description proceeds, this invention resides in the novel construction, combination, and arrangement of elements and portions as will be hereinafter described in the specification, specifically pointed out in the claims, and illustrated in the accompanying drawing, in which:

Figure 1:
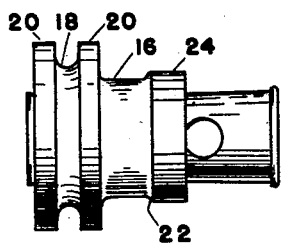
Figure 1 is a side elevational view of the assembled mouthpiece with the valve plunger in open position.
Figure 2:
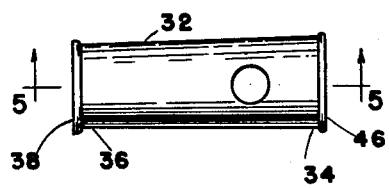
Figure 2 is a side elevational view of the plunger removed from the valve body.
Figure 3:
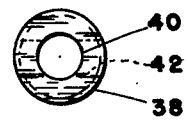
Figure 3 is an end elevational view as taken from the smaller end of the plunger, that illustrated at the left of Figure 2.
Figure 7:
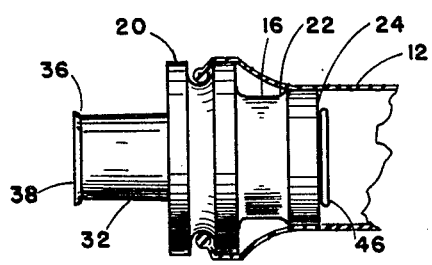
Figure 8:
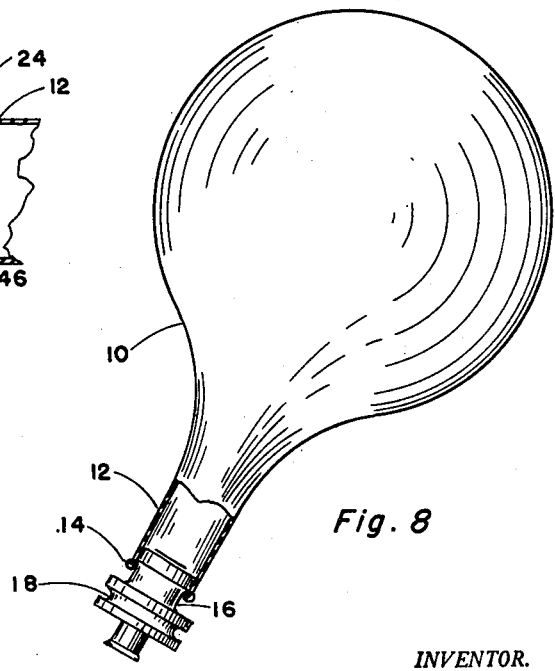

Figure 7 is a side elevational view of the valved mouthpiece, similar to Figure 1 except that the valve plunger is here shown in closed position, and the inflating stem or neck of the balloon is fragmentarily included in this figure to show that, when the neck is engaged with the larger external seat, the smaller external seat portion constitutes a guard for means to prevent an intermediate portion of the neck from contacting the valve plunger and preventing its free closing action;

Figure 8 is a view of the balloon and mouthpiece, a portion of the neck of the balloon being broken away and shown in section in the position assumed thereby when the smaller external seat is used.

Similar characters of reference indicate similar or identical elements and portions throughout the specification and throughout the different figures of the drawing.

Referring now to the drawing in detail, the disclosed embodiment of this invention includes a toy balloon 10 having an inflating tube or neck 12 with a terminal bead or thickened portion 14. A valved mouthpiece is used with this balloon and includes a valve body 16 constructed preferably of plastic or other material which is slightly deformable. The valve body 16 has an integral larger external seat 18 which may be considered as defined by parallel flange-like annular ribs 20. At the other end of the valve body 16 there is provided a smaller external seat 22 which may be considered as defined, at least in part, by an enlargement 24 of the valve body. For purposes of this description, the enlargement 24 may be considered as synonymous with the smaller external seat 22 since it is the principal element concerned with the retention of the neck 12 and terminal bead 14 of a small balloon, as illustrated in Figure 8. It is extremely important to note in this regard that this smaller external seat or enlargement 24 has a critical function in holding the said neck 12 out of engagement with the valve plunger 32 hereinafter described more specifically.

Figure 6:
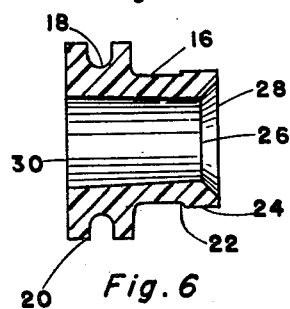
Figure 6 is a vertical, central, sectional view of the valve body.
Figure 5:
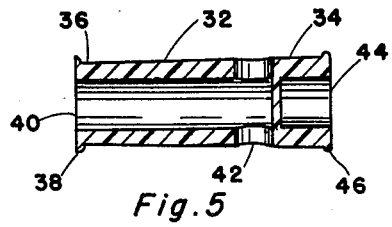
Figure 5 is a horizontal, central, sectional view taken on the line 5—5 in Figure 2.
Figure 4:
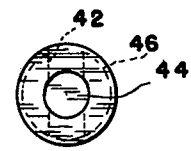
Figure 4 is a similar view of the plunger, represented as taken from the right hand end, the larger end, of the plunger.

The valve body has an internal valve seat 26 which, for purposes of this description, will be considered the substantially linear engagement surface, best illustrated in Figure 6, at the junction of the terminal bore portion 28 tapering to its smallest dimension at said valve seat 26 and the major bore portion 30 tapering, in the opposite direction, to its smallest diameter at the valve seat 26. This dual tapering of the valve-receiving bore is important in attaining the desired linear contact with the valve plunger.

The valve plunger 32 is also constructed of somewhat deformable material such as numerous plastics currently available and this further promotes the desired perfect sealing. The plunger is axially longer than the valve body 16 and is tapered with the larger end 34 disposed toward the terminal bore portion 28, and the smaller end 36 disposed toward the major bore portion 30. It may be here noted that the tapper of the plunger 32 and the tapers of the bore portions 28 and 30 are shown exaggerated in the drawing. A stop 38 is provided at the smaller end of the plunger 32. It should also be carefully noted that the tapering of the plunger is in the opposite direction to the tapering in the major bore portion 30. The tapering of the major bore portion 30, aside from producing the linear contact required, also provides a very large clearance for the smaller end 36 of the plunger so that there is virtually no friction between this smaller end portion and the valve body and the valve plunger is permitted to orient itself more freely in assuming its position and such linear contact with the valve seat.

The plunger has an axial bore 40 extending from the smaller end of the plunger to a transverse bore 42 positioned so as to be on the proper side of valve seat 26, that is, in the bore 30 when the major end portion 34 of the plunger is in closed or sealed relation to the valve seat. On the other hand, the transverse portion 42 must be positioned on the opposite side of the valve seat 26 or toward the terminal bore portion 28, as illustrated in Figure 1, when the plunger is in open position.

The major end 34 of the valve plunger is provided with a cup-shaped configuration indicated at 34. This reduces the mass of plastic at this point and therefore reduces contraction and deformation in casting, but the same cup-shaped configuration has been found to improve the valve action quite dramatically. The valve plunger may be considered an element immersed in a high velocity jet of fluid represented by the column of air seeking escape from the balloon when the external pressure is suddenly released upon completion of the inflation of the balloon. As such, this element or plunger is subject to inertial, viscous and gravity forces. It is assumed that gravity might as well be ignored since there is no assurance it will be operated at any particular attitude. The mass of the plunger is reduced to a minimum consistent with the provision thereof in deformable plastic material, and the cup-shaped configuration at 44. This feature, together with the pronounced annular lip 46 at this end of the plunger, result in the setting up of maximum resistance to establishment of a differential between the rate of flow of the air jet and the rate of movement of the plunger. In other words, the configuration of the plunger is such as to create maximum turbulence and skin-friction, sometimes referred to as deformation drag. The end result is that the plunger has minimum mass and maximum acceleration and this, combined with the fact that the mating elements, valve seat 26 and valve plunger portion 34 are both slightly deformable, results in a perfect seal on the linear contact of valve seat 26, even when low pressures are concerned. It need hardly be stated that the direct result of the increased acceleration is that the plunger strikes the valve seat 26 with considerable force sufficient to cause minor but effective deformation and perfect sealing. A balloon inflated with the means herein specified will remain inflated indefinitely if the balloon itself is gas tight.

It is understood that minor variation from the form of the invention disclosed herein may be made without departure from the spirit and scope of the invention, and that the specification and drawing are to be considered as merely illustrative rather than limiting.

We claim:

1. A valve comprising a valve plunger tapered in one direction and having a transverse bore spaced from the larger end of the plunger, and a longitudinal bore extending from the smaller end of the plunger to said transverse bore; a valve body having a valve-receiving bore extending therethrough; a valve seat in said valve-receiving bore and dimensioned for sealing relation with said plunger between said transverse bore and said larger end; said valve-receiving bore having a portion tapering to its smallest dimension at said valve seat, and another portion having its smallest dimension at said valve seat and tapered in the direction opposite to the first mentioned tapering.

2. A valve comprising a valve plunger tapered in one direction and having a transverse bore spaced from the larger end of the plunger, and a longitudinal bore extending from the smaller end of the plunger to said transverse bore; a valve body having a valve-receiving bore; a valve seat in said valve-receiving bore and dimensioned for sealing relation with said plunger between said transverse bore and said larger end; said valve-receiving bore having a portion tapering to its smallest dimension at said valve seat, and another portion having its smallest dimension at said valve seat and tapered in the direction opposite to the first mentioned tapering; said valve body and valve plunger being of plastic material having the characteristic of being deformable; said characteristic and said tapering in opposite directions together operating to assure a substantially linear sealing engagement of said plunger in said valve seat.

3. A valve comprising a valve plunger tapered in one direction and having a transverse bore spaced from the larger end of the plunger, and a longitudinal bore extending from the smaller end of the plunger to said transverse bore; a valve body having a valve-receiving bore; a valve seat in said valve-receiving bore and dimensioned for sealing relation with said plunger between said transverse bore and said larger end; said valve-receiving bore having a portion tapering to its smallest dimension at said valve seat, and another portion having its smallest dimension at said valve seat and tapered in the direction opposite to the first mentioned tapering; said valve plunger being cup-shaped at the larger end thereof and the plunger having a minimum mass consistent with the provision thereof in deformable plastic thus setting up maximum resistance to establishment of a differential between the rate of flow of the air jet and the rate of movement of the plunger during the closing action of the plunger.

4. A valve comprising a valve plunger tapered in one direction and having a transverse bore spaced from the larger end of the plunger, and a longitudinal bore extending from the smaller end of the plunger to said transverse bore; a valve body having a valve-receiving bore; a valve seat in said valve-receiving bore and dimensioned for sealing relation with said plunger between said transverse bore and said larger end; said valve-receiving bore having a tapered portion tapering to its smallest dimension at said valve seat, and another tapered portion having its smallest dimension at said valve seat and tapered in the direction opposite to the first mentioned tapering; said valve plunger being cup-shaped at the larger end thereof and the plunger having a minimum mass consistent with the provision thereof in deformable plastic thus setting up maximum resistance to establishment of a differential between the rate of flow of the air jet and the rate of movement of the plunger during the closing action of the plunger; said valve plunger being only slightly tapered and having a pronounced annular lip extending radially outwardly from said larger end the first mentioned tapered portion of the valve receiving bore providing adequate clearance for the valve plunger to orient itself and thus promote assumption of linear sealing contact at said valve seat, and said linear contact being spaced from said annular lip, said annular lip constituting means to increase skin friction and, thereby further promote said fast closing action.

5. In a balloon assembly a mouthpiece comprising a valve plunger tapered in one direction and having a transverse bore spaced from the larger end of the plunger, and a longitudinal bore extending from the smaller end of the plunger to said transverse bore; a valve body having a valve-receiving bore; a valve seat in said valve-receiving bore and dimensioned for sealing relation with said plunger between said transverse bore and said larger end; said valve-receiving bore having a portion tapering to its smallest dimension at said valve seat, and another portion having its smallest dimension at said valve seat and tapered in one direction opposite to the first mentioned tapering; said valve body being axially elongated and having two axially spaced, annular, external seats; a balloon having a neck selectively engaging said seats; the external seat adjacent the larger end of the plunger being smaller than the other external seat and constituting means to prevent an intermediate portion of the neck of the balloon from fouling the valve plunger when the neck is terminally secured on the other external seat.

References Cited in the file of this patent

UNITED STATES PATENTS

| | | |
|---|---|---|
| 1,314,650 | Holt | Sept. 2, 1919 |
| 1,981,720 | Crane | Nov. 20, 1934 |
| 2,161,274 | Behrend | June 6, 1939 |
| 2,311,748 | Gora | Feb. 23, 1943 |
| 2,524,059 | Kennedy | Oct. 3, 1950 |
| 2,635,387 | Anderson | Apr. 21, 1953 |